US012716769B2

(12) United States Patent
Cartwright et al.

(10) Patent No.: US 12,716,769 B2
(45) Date of Patent: Aug. 25, 2026

(54) WEIGHING SYSTEM AND METHOD FOR REFILLABLE CONTAINERS

(71) Applicant: ILLINOIS TOOL WORKS INC., Glenview, IL (US)

(72) Inventors: Kevin Cartwright, Halesowen (GB); Paul Hines, Birmingham (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 315 days.

(21) Appl. No.: 18/530,913

(22) Filed: Dec. 6, 2023

(65) Prior Publication Data

US 2024/0192046 A1 Jun. 13, 2024

(30) Foreign Application Priority Data

Dec. 7, 2022 (GB) ..................................... 2218351

(51) Int. Cl.
*G01G 23/16* (2006.01)
*G06V 40/16* (2022.01)

(52) U.S. Cl.
CPC ........... *G01G 23/16* (2013.01); *G06V 40/168* (2022.01); *G06V 40/172* (2022.01)

(58) Field of Classification Search
CPC .... G01G 23/16; G01G 19/4144; G01G 15/00; G06V 40/168; G06V 40/172
See application file for complete search history.

(56) References Cited

U.S. PATENT DOCUMENTS 4,793,420 A * 12/1988 Hirano ................. G01G 13/248 177/50
2007/0095578 A1* 5/2007 Sosnik ................... G01G 13/24 177/25.18
2019/0072427 A1* 3/2019 Okamura ............. G07G 1/0072
2021/0216989 A1* 7/2021 Teraoka ................. G01B 21/22
2022/0214208 A1* 7/2022 Chianura ............... G01G 17/04

FOREIGN PATENT DOCUMENTS

CA 2625269 C * 5/2011 ........... G01G 19/022
CN 109117613 A 1/2019
CN 217179739 U 8/2022
EP 0500213 A1 * 8/1992 ................ B65F 3/04

(Continued)

*Primary Examiner* — Tarun Sinha
*Assistant Examiner* — Julia Fitzpatrick
(74) *Attorney, Agent, or Firm* — THOMPSON HINE LLP

(57) ABSTRACT

A weighing system and method for refillable containers. A control system includes one or more processors and at least one memory configured to store user data associated with a user, the user data includes biometric data indicative of a biometric identifier of the user and container data indicative of an empty container weight. The control system is configured to: receive a request to weigh a product in a container; receive captured data indicative of the biometric identifier from a biometric capture device; output a control signal to control a scale to weigh the product in the container; receive, from the scale, weight data indicative of the weight measured by the scale; identify the container data associated with the user by comparing the captured data to the biometric data stored in the memory; and determine a corrected weight of the product in dependence on the weight data and the container data.

20 Claims, 5 Drawing Sheets

(56) References Cited

FOREIGN PATENT DOCUMENTS

| | | | | | |
|---|---|---|---|---|---|
| EP | 1873705 | A1 | | 1/2008 | |
| ES | 2643667 | T3 | * | 11/2017 | ......... G01G 19/4144 |
| GB | 2591530 | A | * | 8/2021 | ........... G06Q 20/208 |
| JP | 2017156140 | A | * | 9/2017 | ........... G06Q 20/208 |
| WO | WO-2022211738 | A1 | * | 10/2022 | ............. G01G 23/42 |

* cited by examiner

WEIGHING SYSTEM AND METHOD FOR REFILLABLE CONTAINERS

TECHNICAL FIELD

This invention relates to a control system, a weighing system and a method for a weighing apparatus for refillable containers.

BACKGROUND

Supermarkets and other outlets may provide the facility for customers to package their own products. This facility allows customers to bring their own container to refill with the products in order to reduce packaging waste. This system can be implemented for various grocery products such as dried produce, cleaning products, fruits and vegetables or the like. Such products are displayed loose or in a bulk container in contrast to being individually portioned. Because the quantity of the product purchased by the customer may fluctuate depending on the size of container used by the customer, these products are typically be charged by unit, e.g., by weight or volume. The customer may then fill their container and weigh the container at a weighing apparatus.

The weighing apparatus then calculates a weight of the product and controls a label printer to print a label for the customer for scanning at the point of sale. It is a challenge for this type of weighing system to account for the weight of the empty container. Because customers may bring containers having varying, non-standard weights, there is a need for the weighing apparatus to know the weight of each empty container in order to determine the weight of the product inside for each customer. Thus, typically the customer will weigh the empty container at the weighing apparatus prior to filling. The weighing apparatus calculates a weight of the empty container and controls the label printer to print a label indicating the empty container weight. When the customer returns to the weighing apparatus to weigh the product, they first scan the label at the weighing apparatus to provide the weighing apparatus with the empty container weight.

However, this method requires printing two labels per container for each visit (a first label for the empty container, and a second label for the filled container) which causes additional waste. Because the label indicating the empty container weight will typically not be resilient to washing, two labels must be printed at each visit.

Examples disclosed herein may address one or more of the above problems.

SUMMARY

In accordance with the present inventions there is provided a control system, a weighing system, and a computer-implemented method.

According to a first aspect, there is provided a control system for a weighing apparatus for refillable containers, the control system comprising one or more controllers, the control system comprising: one or more processors; at least one memory configured to store user data associated with a user, the user data comprising biometric data indicative of a biometric identifier of the user and container data indicative of an empty container weight; wherein the control system is configured to: receive a request to weigh a product in a container; receive captured data indicative of the biometric identifier of the user from a biometric capture device associated with the weighing apparatus; output a control signal to control a scale associated with the weighing apparatus to weigh the product in the container; receive, from the scale, weight data indicative of the weight measured by the scale; identify the container data associated with the user by comparing the captured data to the biometric data stored in the memory; and determine a corrected weight of the product in dependence on the weight data and the container data. Advantageously, the container weight can be accounted for during the weighing process by recognising the user based on the relevant biometric identifier, without needing to print multiple labels.

The biometric identifier may be any measurable characteristic used to identify the user, such as a physiological or behavioural characteristic. Examples include but are not limited to fingerprint, palm print, facial parameters, DNA, iris recognition, retina and voice recognition. Examples herein will be described using facial parameters as a suitable biometric identifier, however it will be appreciated that any alternative biometric identifier may be utilised in conjunction with a biometric capture device capable of capturing data from which the biometric identifier may be obtained. For example, in the case of voice recognition, the biometric capture device may comprise a microphone. In the case of using a fingerprint parameter as the biometric identifier, the biometric capture device may comprise a fingerprint reader.

In some embodiments, the biometric data comprises facial data indicative of a face of the user, the captured data comprises an image of the face of the user, and the biometric capture device comprises an imaging device.

Optionally, the biometric identifier comprises one or more facial parameters. The control system may be configured to compare the captured image to the facial data by extracting the one or more facial parameters of the user from the captured image and comparing the one or more facial parameters to the facial data stored in the memory.

Optionally, the facial data comprises a parameter derived from one or more facial measurements. Optionally, the control system is configured to compare the captured image to the facial data stored in the memory using a facial recognition algorithm.

Optionally, the control system is arranged to determine the user data by outputting a control signal to a biometric capture device to capture first captured data indicative of the biometric identifier of the user and a control signal to a scale to measure a weight of the empty container; determining the biometric data in dependence on the first captured data of the user and determining the container data in dependence on a measured weight of the empty container; and associating the container data with the biometric data in the memory to form the user data. Optionally, the biometric capture device is an imaging device, and the first captured data comprises a first image. In some embodiments, the biometric capture device is the same device from which the captured data is received. In other embodiments, a first biometric capture device captures the first captured data, and a second biometric capture device captures the captured data. The control system may be arranged to determine the user data in response to receiving a request to weigh an empty container.

The memory may be configured to store respective user data associated with each of a plurality of users, wherein for each user the user data comprises respective container data and biometric data. The control system may then be configured to: compare the captured data to the biometric data of each of the plurality of users to identify the user in the captured data; and identify the respective container data associated with the identified user.

Optionally, the control system is configured to delete the user data associated with the user from the memory following the determination of the corrected weight.

The control system may be arranged to output a signal indicative of the corrected weight. Optionally, the control system is arranged to determine label data for the product in dependence on the corrected weight; and output a print signal to a label printing device to cause the label printing device to print an information label for the item to display the label data. The memory may be configured to store price information associated with the product, and the control system may be configured to determine the label data in dependence on the corrected weight and the price information. The label data may comprise a machine readable code indicative of the corrected weight and the price information.

According to another aspect there is provided a weighing system comprising: at least one biometric capture device; at least one scale; and the control system according to the aspect above. The biometric capture device may be an imaging device.

The weighing system may comprise at least one label printing device for printing an information label for the product. The weighing system may comprise a user interface configured to receive a user input indicative of a request to weigh a product in a container.

According to another aspect, there is provided a computer-implemented method for weighing a product at a weighing apparatus, comprising: storing user data associated with a user, the user data comprising biometric data indicative of a biometric identifier of the user and container data indicative of an empty container weight; receiving a request to weigh a product in a container; receiving captured data indicative of the biometric identifier of the user from a biometric capture device associated with the weighing apparatus; outputting a control signal to control a scale associated with the weighing apparatus to weigh the product in the container; receiving, from the scale, weight data indicative of the weight measured by the scale; identifying the container data associated with the user by comparing the captured data to the biometric data stored in the memory; and determining a corrected weight of the product in dependence on the weight data and the container data.

In some embodiments, the biometric data comprises facial data indicative of a face of the user, the captured data comprises an image of the face of the user, and the biometric capture device comprises an imaging device.

According to another aspect, there is provided a computer readable storage medium including instructions to perform a method comprising: storing user data associated with a user, the user data comprising biometric data indicative of a biometric identifier of the user and container data indicative of an empty container weight; receiving a request to weigh a product in a container; receiving captured data indicative of the biometric identifier of the user from a biometric capture device associated with the weighing apparatus; outputting a control signal to control a scale associated with the weighing apparatus to weigh the product in the container; receiving, from the scale, weight data indicative of the weight measured by the scale; identifying the container data associated with the user by comparing the captured data to the biometric data stored in the memory; and determining a corrected weight of the product in dependence on the weight data and the container data.

In some embodiments, the biometric data comprises facial data indicative of a face of the user, the captured data comprises an image of the face of the user, and the biometric capture device comprises an imaging device.

BRIEF DESCRIPTION OF THE DRAWINGS

Embodiments of the invention are further described hereinafter with reference to the accompanying drawings, in which.

DETAILED DESCRIPTION

Examples disclosed herein relate to a control system for one or more weighing apparatus, specifically for use with refillable containers. The control system is arranged to store biometric data indicative of a biometric identifier of a user in memory alongside an empty container weight for that user. When a user arrives at the weighing apparatus to weigh a filled container, the control system is arranged to capture biometric data of the user and retrieve the empty container weight from memory by comparing the captured biometric data to the stored biometric data. For example, the biometric data may be facial data indicative of a face of the user, and the control system may be arranged to capture an image of the user for facial recognition. However, other biometric identifiers may also be used. The retrieved empty container weight is used to calculate a weight of the goods in the filled container.

Figure 1:
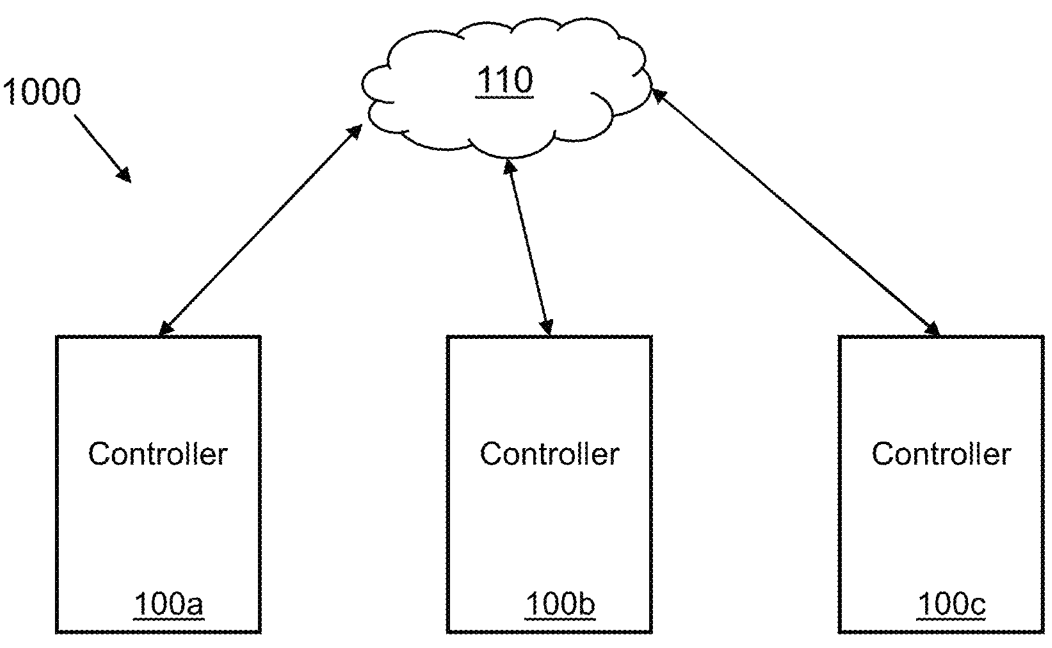
FIG. 1 is a schematic illustration of a control system 1000 according to an embodiment.

With reference to FIG. 1, there is shown a schematic illustration of a control system 1000 according to the present invention. The control system 1000 comprises one or more controllers, or control modules 100. Although the controllers 100*a*, 100*b*, 100*c* are illustrated, it will be appreciated that the control system 1000 may comprise any number of controllers 100. The controllers 100 may be in communication with each other via one or more networks 110, such as a local area network (LAN) in-store or the Internet.

Figure 2A:
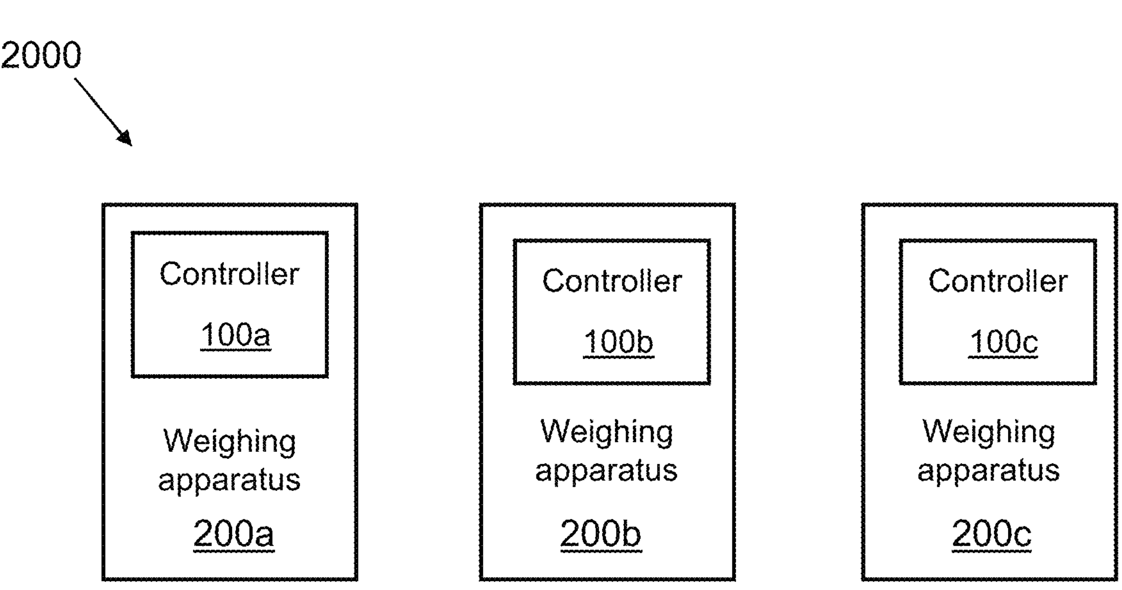
FIG. 2A is a schematic illustration of a weighing system 2000 according to an embodiment.

With reference to FIG. 2A, the control system 1000 may be installed within a weighing system 2000 for a retail environment, such as a supermarket or the like. The weighing system 2000 comprises one or more weighing apparatus 200. Three weighing apparatus 200*a*, 200*b*, 200*c* are illustrated, however any number of weighing apparatus 200 may be implemented. Each controller 100 may be associated with a respective weighing apparatus 200.

Figure 2B:
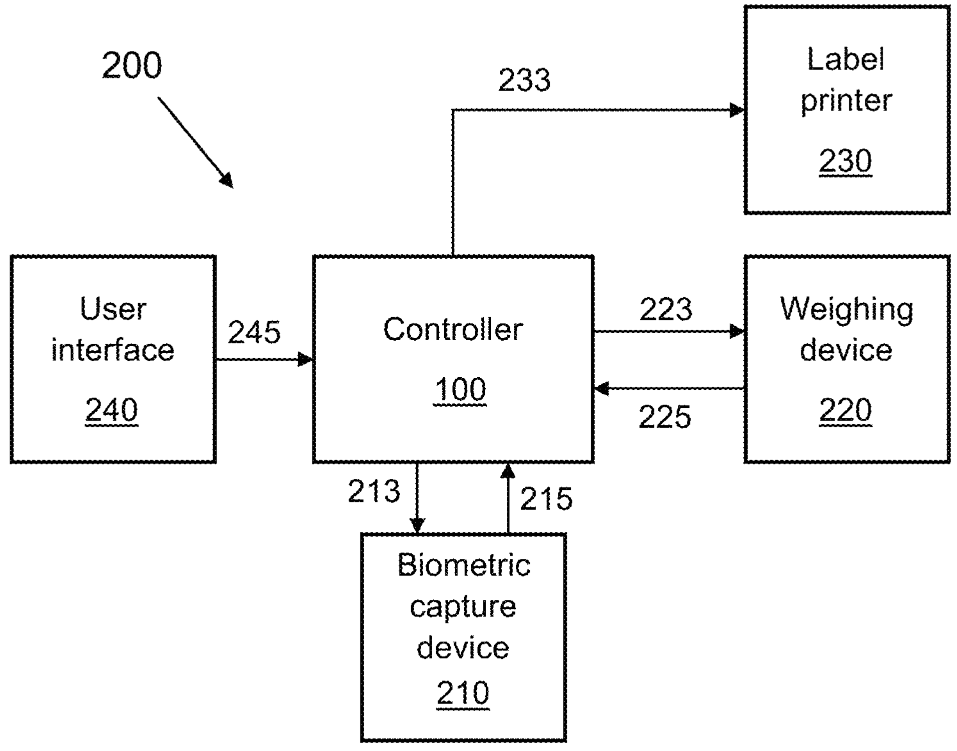
FIG. 2B is a schematic illustration of a weighing apparatus 200 of the weighing system 2000.

A schematic illustration of one weighing apparatus 200 is shown in FIG. 2B. Each weighing apparatus 200 is arranged to enable a customer to weigh an empty refillable container, or a refillable container filled with a product, and print a label for said product as will be explained. The weighing apparatus 200 may be installed proximal to the displayed product. In use, the customer can weigh their empty container at a weighing apparatus 200, fill the container with the product and weigh the filled container at the same weighing apparatus 200 or another weighing apparatus 200. Each of the weighing apparatus 200 may be dedicated to either weighing empty containers or filled containers. However, in other embodiments, the same weighing apparatus 200 may be operable to weigh both empty containers and filled containers depending on a customer input.

The weighing apparatus 200 comprises one or more controllers 100 of the control system 1000 for controlling the other components of the weighing apparatus 200. In some embodiments, a respective controller 100 is comprised in each weighing apparatus 200. Alternatively, a single controller 100 may be arranged to control more than one weighing apparatus 200. The functions of the control system 1000 can be distributed in various ways.

The weighing apparatus 200 comprises one or more user interfaces 240 for receiving input from a user, and/or providing output to a user. The user interface(s) 240 may be integrated with the hardware of the controller 100 or may be remotely located. In some embodiments, it could be envisaged that the user interface 240 may be implemented on a remote device, such as a mobile device of the user in communication with the controller 100. The user interface 240 may comprise a display for providing visual output to a user, and an input device such as a keyboard or touch screen for receiving input from a user. The display and input device may be integrated, such as in a touch screen user interface 240, or may be separate devices. Alternatively, or additionally, the user interface 240 may comprise an audio input device for receiving audio input such as a microphone, and/or an audio output device for providing audio output such as a speaker.

In use, the user interface 240 is arranged to receive user input indicative of a request to weigh a container. The request may indicate whether the user is weighing an empty container, or a container filled with a product. If the request is to weigh a container filled with a product, the request may further include an indication of the product inside the container. The controller 100 is arranged to receive the request 245 from the user interface 240.

The weighing apparatus 200 further comprises a weighing device 220 such as a scale 220. The weighing device 220 comprises a platform or other receptacle on which a customer may place the container or product to be weighed. The weighing device 220 may comprise any mechanism for measuring the weight of goods placed on the platform and converting the measurement into an electrical signal, such as a load cell, strain gauge or the like. The controller 100, upon receiving the request 245, is arranged to output a control signal 223 to control the weighing device 220 to weigh the container placed on the weighing device 220. The weighing device 220 is configured to output weight data 225 indicative of a measured weight of the container.

The weighing apparatus 200 further comprises one or more biometric capture devices 210 in communication with the controller 100. For example, the one or more biometric capture devices 210 may comprise one or more imaging devices 210 such as cameras or the like. Embodiments will be described with reference to the biometric capture devices 210 being imaging devices 210 for using a facial parameter as a biometric identifier. However in other embodiments, it will be appreciated other biometric identifiers may be used. Then, each biometric capture device 210 may be any biometric capture device 210 able to capture biometric data from which the relevant biometric identifier may be extracted. For example, to implement voice recognition, the biometric identifier may be a parameter associated with a user's voice. Thus, the biometric capture device 210 may comprise a microphone able to capture biometric data in the form of a voice recording of the user. In other embodiments, the biometric identifier may comprise retinal data, and the biometric capture device 210 may comprise a retinal scanner 210.

Returning to the facial recognition embodiment, each imaging device 210 is arranged proximal to the weighing device 220 such that it is arranged to capture an image of a face of a user using the weighing device 220. For other biometric identifiers, the respective biometric capture device 210 may be suitably arranged to capture data indicative of the biometric identifier of the user using the weighing device 220. Typically, this will mean locating the biometric capture device 210 at or proximal to the weighing device 220.

Upon receiving the request 245 to weigh a container, the controller 100 is arranged to output a control signal 213 to control the biometric capture device 210 to capture data indicative of the biometric identifier. For example, in the case of the imaging device 210, the captured data may comprise an image of a face of the user. The biometric capture device 210 is then configured to communicate the captured data 215, e.g. the captured image, indicative of the biometric identifier to the controller 100 for processing.

Figure 6:
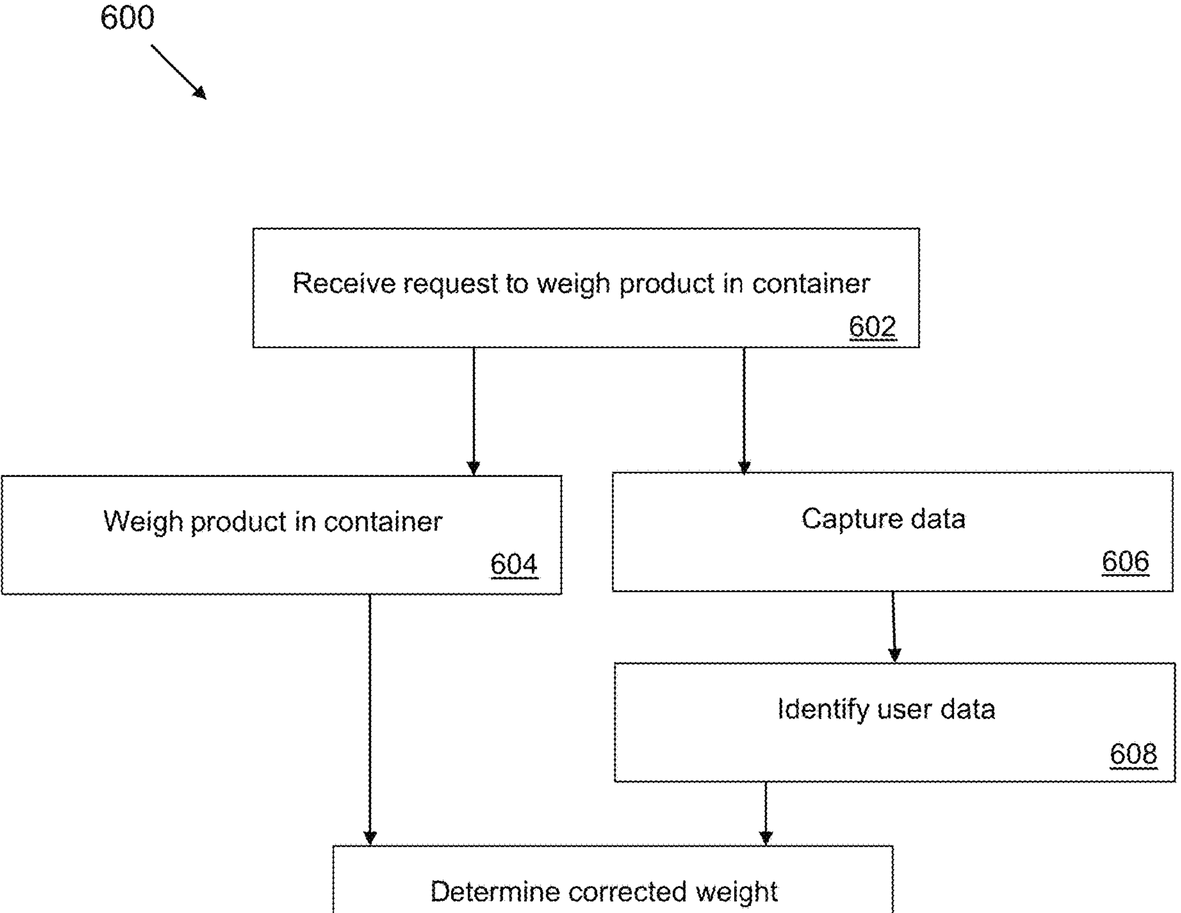
FIG. 6 is a flow chart showing a method 600 of determining a corrected weight according to an embodiment.

The controller 100 is arranged to determine a weight of the product in the container based on the received weight data 225 and captured data 215, as will be explained with reference to FIG. 6.

The controller 100 may be arranged to use the determined weight of the product to determine the contents of an information label for the product. The weighing apparatus may therefore further comprise a label printer 230 in communication with the controller 100. The label printer 230 is configured to print an information label to reflect the quantity of the item packaged by the customer into the container. An "information label" according to the present disclosure may be any label displaying information associated with the quantity of the item packaged, such as a weight of the packaged item, a volume of the packaged item, or a total price of the packaged item. The information label may comprise a machine readable code, such as a QR code, bar code or the like encoding some of the information. The printed information label may be affixable to the container used by the customer for ease of scanning at the point of sale.

Figure 3:
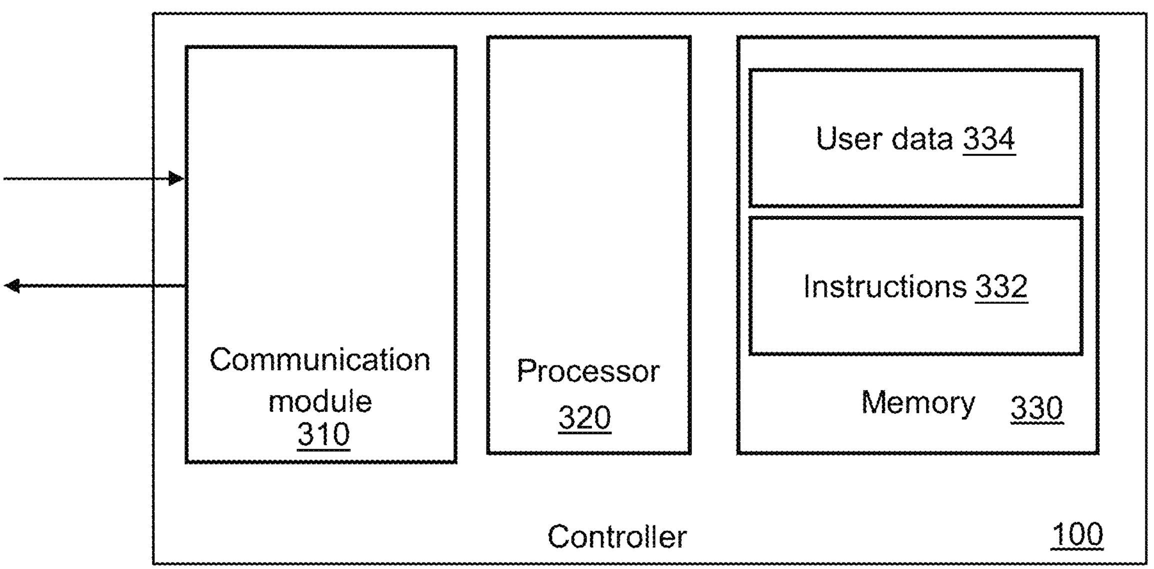
FIG. 3 is a schematic illustration of a controller 100 of the control system 1000.

The controller 100 is illustrated schematically in FIG. 3, and comprises at least one processor 320, communication module 310 and memory 330. The memory 330 is arranged to store user data 334 associated with at least one user. The memory 330 may comprise one or more memory devices, which may be disposed locally to the controller 100, remotely to the controller 100, or a combination. In the case of a remotely located memory device, the memory device may be wirelessly communicable with the processor 320 of the controller 310, such as over the one or more networks 110. This may be the case in particular when the control system 1000 is distributed across a plurality of weighing apparatus 200. When this is the case, a customer may use a different weighing apparatus 200 to weigh the empty container to that used for the filled container. Thus, the controller of each weighing apparatus 200 may communicate user data to a common storage location, such that the user data can be collated and shared throughout the control system 1000.

Figure 4:
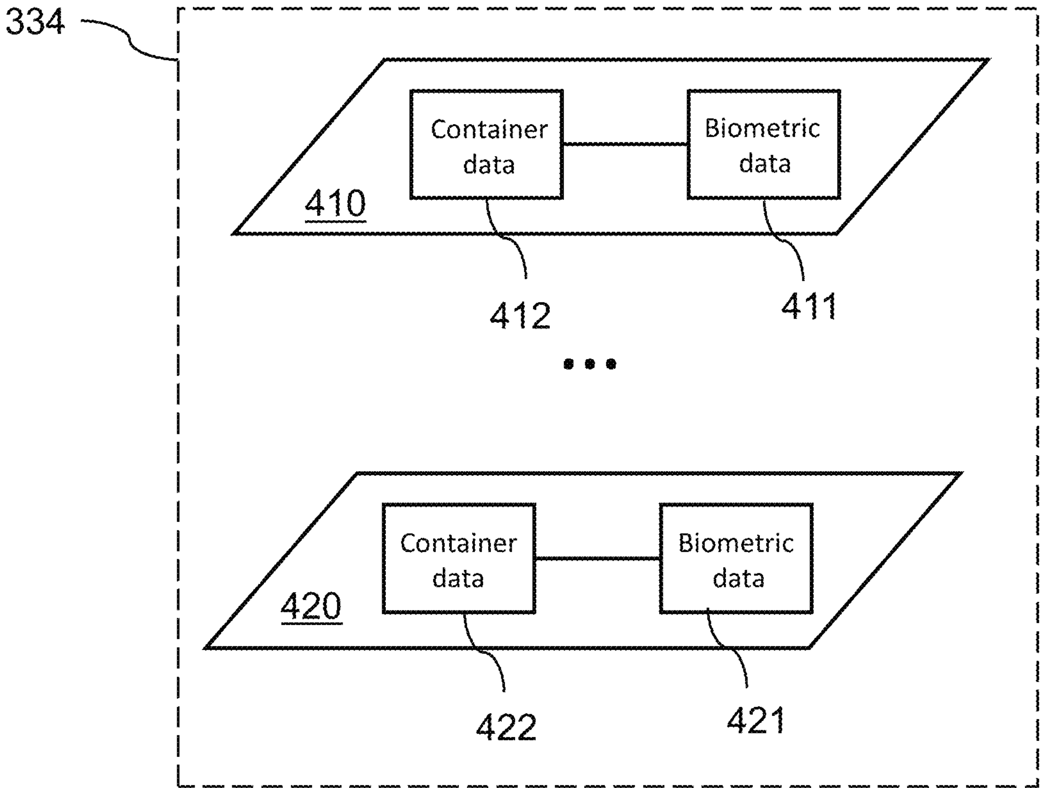
FIG. 4 illustrates example user data 334 stored by the control system 1000.

With reference to FIG. 4, there is shown a schematic illustration of example user data 334 stored by the control system 1000. The user data 334 comprises data associated with at least one user. In the illustrated example, the user data 334 comprises data associated with two users: first user data 410 associated with a first user, and second user data 420 associated with a second user, however the user data 334 may comprise data for more or fewer users, depending on the system. Furthermore, the quantity of user data 334 may fluctuate over time, as will be explained.

Each instance of the user data 334 comprises biometric data 411, 421 indicative of a biometric identifier of the user. For example, in the facial recognition embodiment, the biometric data 411, 421 may comprise facial data indicative of a face of the user. The user data 334 further comprises container data 411, 421 indicative of an empty container weight for the user. The biometric data 411, 421 and container data 411, 421 for each user may be associated in memory and are determined and stored by the control system 1000 during an initial collection phase when the user weighs the empty container, as will be explained with reference to FIG. 5.

Returning to FIG. 3, the controller 100 further comprises at least one communication module 310. The at least one communication module 310 is configured to communicate with each of the user interface 240, biometric capture device 210, weighing device 220 and label printer 230 of the weighing apparatus 200. The communication module 310 may comprise electrical connections for connecting to a wired network and/or may comprise hardware for performing wireless communication such as Wi-Fi, Bluetooth or the like. The communication module 310 is arranged to receive the request 245 from the user interface 240, the captured data 215 from the biometric capture device 210 and the weight data 225 from the weighing device 220 and communicate the label data 233 to the label printer 230.

The controller 100 further comprises at least one processor 320 which is arranged to perform a method according to instructions 332 stored in the memory 330. The processor 320 is configured to perform a method as will be explained with reference to the following figures.

Figure 5:
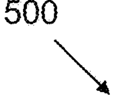
FIG. 5 is a flow chart showing a method 500 of determining user data according to an embodiment.
Figure 5:
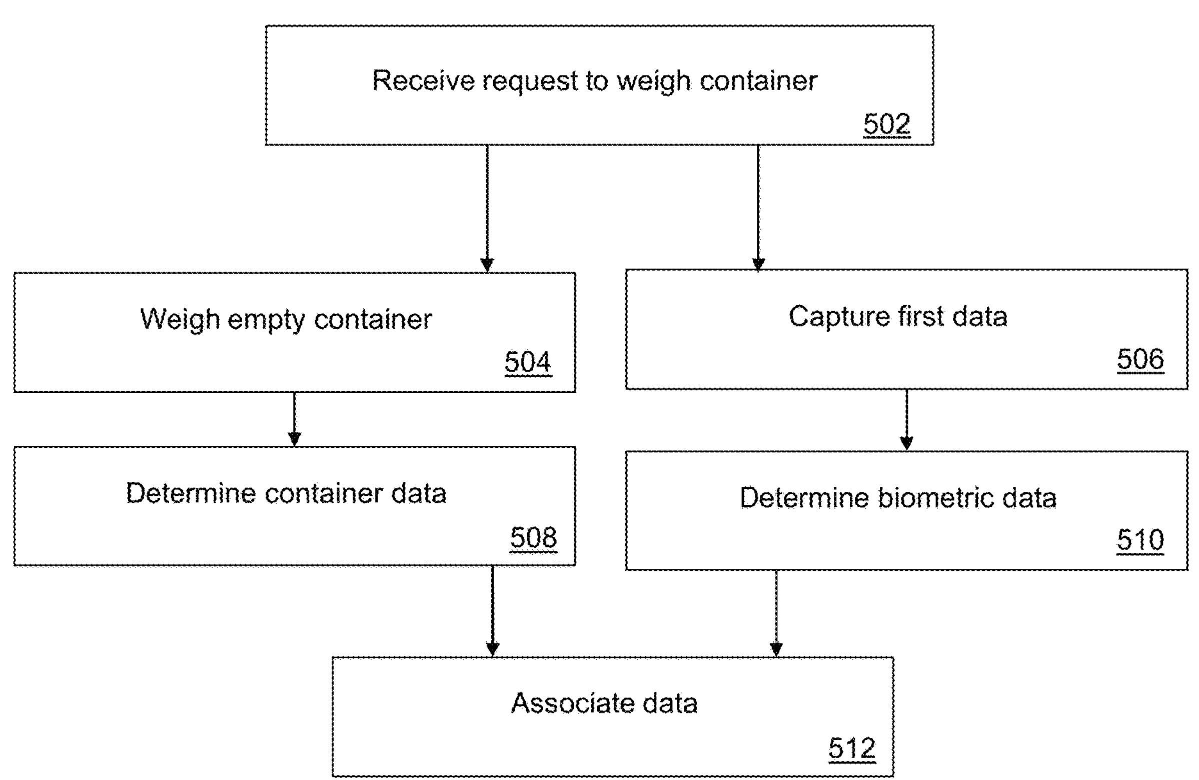

A flow chart is shown in FIG. 5 illustrating a method 500 of determining the user data 334 for a particular user. The method 500 may be performed by the control system 1000 each time a user weighs an empty container at a weighing apparatus 200.

In step 502, a request is received at a weighing apparatus 200 to weigh an empty container. The request is received through the user interface 240 of the weighing apparatus 200 and communicated to the controller 100. In some embodiments, the weighing apparatus 200 may be dedicated to weighing empty containers, for example the weighing apparatus 200 may be disposed in a specific empty container weigh station of the retail environment. In this case, the request received may be via a generic input by the user to the user interface 240, such as a selection to begin weighing, or may be triggered automatically by the presence of an item on the weighing device 220. In other embodiments, the same weighing apparatus 200 may be used for both weighing empty containers and filled containers. Thus, the request may comprise information indicating the selection to weigh an empty container. For example, the user interface 240 may display multiple options, and the user input to select the option of weighing an empty container may trigger the request 245.

In block 504, the weight of the empty container is measured. In order to measure the weight of the empty container, the user places the empty container on the platform of the weighing device 220. In response to the request received in block 502, the controller 100 outputs a control signal 223 to the weighing device 220 to measure the weight of the empty container, and the weighing device 220 communicates the empty container weight 225 back to the controller 100. In block 508, the controller 100 determines the container data to comprise the measured empty container weight 225.

In block 506, first captured data indicative of the biometric identifier of the user is obtained by the biometric capture device 210. In response to the request received in block 502, the controller 100 outputs a control signal 213 to the biometric capture device 210 to capture the first captured data of the user. In embodiments utilising biometric identifiers obtained from facial recognition, the first captured data may be a first image of the user captured by the imaging device 210. In particular, the first image is of a face of the user. The biometric capture device 210 is then arranged to communicate data 215 indicative of the first captured data back to the controller 100.

In block 510, the controller is arranged to determine biometric data in dependence on the first captured data of the user. For example, the controller may be configured to extract the biometric identifier from the first captured data. Examples will be described with respect to facial recognition wherein the controller is arranged to determine biometric data in the form of facial data in dependence on the first image of the user.

In some embodiments, the facial data may comprise at least some of the first image, that is the control system 1000 may store the entirety or a part of the first image including a face of the user. In other embodiments, the facial data may be derived from the first image but the first image itself may not be retained. The facial data may be arranged to be sufficient for a facial recognition algorithm to identify further images which include the face of the user.

In particular, the facial data may comprise a parameter derived from the first image. In block 510, the controller may be arranged to analyse the first image to extract landmarks or features of the user's face from the first image—for example, the relative position, size, and/or shape of the eyes, nose, cheekbones, and jaw. One or more facial measurements may be obtained from the extracted features, such as a distance between the eyes or a distance from forehead to chin, however it will be appreciated that any facial measurement may be taken. The facial measurements may be used to define a unique facial signature for the user, such as a string or a number. The facial data may therefore comprise any of the first image, the extracted features, the facial measurements or a parameter or signature derived therefrom.

In other embodiments, the controller may be arranged to extract the relevant biometric identifier from the captured data. For example, in embodiments utilising voice recognition, the captured data may comprise a recording of the user speaking. In block 510, the controller may be arranged to extract one or more features from the recording to form a voice print as a biometric identifier which is stored in the biometric data. In another example, for fingerprint recognition, the captured data may comprise a scan of the user's fingerprint obtained from a fingerprint scanner. In block 510, the controller may be arranged to extract one or more geometric parameters from the scan, and store the one or more geometric parameters as the biometric data.

In block 512, the container data determined in step 508 and the biometric data, e.g. facial data, determined in step 510 may be associated in the memory 330 to form the user data 334. For example, with reference to FIG. 4, the container data 412 and the biometric data 411 obtained for the first user may be associated, such as in a relational database or the like, to form the first user data 410. This method 500 may be repeated for a plurality of users to form user data 334 including respective container data 412, 422 and associated biometric data 411, 421 for each of the users.

Once the user has weighed the empty container to create the user data as in method 500, the user may proceed to fill the container with a product. Once the container is filled, the user returns to a weighing apparatus 200 to weigh the product. The weighing apparatus 200 may be the same one which was used to weigh the empty container or may be a different weighing apparatus within the system 2000. With reference to FIG. 6, there is shown a method 600 performed by the control system 1000 of determining a weight of the product in the container.

In block 602, the controller 100 of the weighing apparatus 200 receives a request to weigh a product in a container. As with block 502, the request may be received from the user interface 240. The request may include an indication that the container is filled with a product, and also an indication of the type of product within the container. This may be input manually by the user via the user interface 240 such as through textual or voice input, or alternatively may be selected by the user from a number of options displayed via the user interface 240.

In block 604, the product and container are weighed by the weighing apparatus 200. The user may place the container holding the product on the platform of the weighing device 220. The controller 100 outputs a control signal to the weighing device 220 to control the weighing device 220 to weigh the product and container. The weighing device 220 then communicates to the controller 100 weight data 225 indicative of a combined weight of the product and container.

In block 606, the weighing apparatus 200 captures data indicative of the biometric identifier of the user. For example, the weighing apparatus 200 may capture an image of the face of the user. The data is captured by the biometric capture device 210 and communicated to the controller 100.

In block 608, the user in the captured data is identified. The controller is arranged to analyse the captured data and compare the captured data to the biometric data 411, 421 stored in the memory 330 to identify the biometric data 411, 421 corresponding to the user in the captured data. For example, the captured data may comprise a captured image of the user. Thus, block 608 may comprise extracting facial parameters from the captured image in the same way as for the facial data in step 510. The extracted facial parameters, features or signature may then be compared to the facial data 411, 421 stored in the memory. Any type of facial recognition algorithm may be used to match the captured image to the stored facial data. Analogous recognition algorithms may be utilised to compare other biometric identifiers such as voice features, fingerprint features, retinal features and the like extracted from the captured data to the biometric data 411, 421 stored in the memory.

As discussed, the memory 330 may be arranged to store user data for a plurality of users. In block 608, by comparing the captured data to the biometric data 411, 421 of each of the plurality of users, the captured data can be matched to biometric data 411, 421 for the correct user. For example, the captured data may be analysed and matched to the first biometric data 411, thus identifying the user in the captured data as the first user.

Once the biometric data 411 has been identified, the container data 412 associated with the identified user is retrieved.

In block 610, the retrieved container data 412 and the weight data 225 are used to determine a corrected weight of the product. The corrected weight can be determined by subtracting the empty container weight from the measured combined weight of the container and product, providing the weight of the product alone. For example, if the weight data 225 indicates a weight of 2.5 kg and the container data 412 indicates the empty container has a weight of 0.25 kg, the corrected weight of the product can be calculated as 2.5 kg−0.25 kg=2.25 kg.

The corrected weight can then be used by the controller 100 to determine label data for printing and affixing to the filled container. The label data may indicate the corrected weight of the product and/or further product information stored in the memory 330 or otherwise accessible to the controller 100 such as a price per unit, allergen information or the like.

In particular, the controller 100 may be arranged to determine a price for the product in dependence on the corrected weight and the price per unit and include the determined price in the label data. The label data may include a machine readable code, such as a QR code or bar code, for encoding the price, weight, or other item information for scanning at a point of sale.

Once the controller 100 determines the label data, the controller 100 may output a control signal 233 to the label printer 230 to print an information label for the product including the label data to affix to the container.

In some embodiments, the control system 1000 is configured to delete the user data associated with the respective user from the memory 330 following the use of the user data to determine the corrected weight in block 610. Thus, the biometric data and container data may only be transiently stored by the control system 1000 between the point at which the user weighs the empty container and the time at which the user returns to weigh the filled container, thereby only holding the user's biometric information for a short amount of time. In other embodiments, the user may return repeatedly to the store using the same container. Thus, it is possible that the user data may be retained for a longer period of time so that the user does not need to perform an iteration of the method 500 each time they return to the store.

Advantageously, the present invention thus provides a mechanism for correcting for the weight of a user's refillable container whilst avoiding the necessity to print multiple labels for the container, which can be burdensome for the user and expend unnecessary resources.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words “comprise” and “contain” and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A control system for a weighing apparatus for refillable containers, the control system comprising one or more controllers, the control system comprising:

one or more processors;

at least one memory configured to store user data associated with a user, the user data comprising biometric data indicative of a biometric identifier of the user and container data indicative of an empty container weight; and wherein the control system is configured to:

receive a request to weigh a product in a container;

receive captured data indicative of the biometric identifier of the user from a biometric capture device associated with the weighing apparatus;

output a control signal to control a scale associated with the weighing apparatus to weigh the product in the container;

receive, from the scale, weight data indicative of the weight measured by the scale;

automatically identify the container data associated with the user by comparing the captured data to the biometric data stored in the memory; and automatically determine a corrected weight of the product in dependence on the weight data and the container data that is automatically identified.

2. The control system of claim 1, wherein the biometric data comprises facial data indicative of a face of the user, the captured data comprises an image of the face of the user, and the biometric capture device comprises an imaging device.

3. The control system of claim 2, wherein the biometric identifier comprises one or more facial parameters, and wherein the control system is configured to compare the captured image to the facial data by extracting the one or more facial parameters of the user from the captured image and comparing the one or more facial parameters to the facial data stored in the memory.

4. The control system of claim 2, wherein the facial data comprises a parameter derived from one or more facial measurements.

5. The control system of claim 2, wherein the control system is configured to compare the captured image to the facial data stored in the memory using a facial recognition algorithm.

6. The control system of claim 1, wherein the control system is arranged to determine the user data by:

outputting a control signal to a biometric capture device to capture first captured data indicative of the biometric identifier of the user and a control signal to a scale to measure a weight of the empty container;

determining the biometric data in dependence on the first captured data of the user and determining the container data in dependence on a measured weight of the empty container; and associating the container data with the biometric data in the memory to form the user data.

7. The control system of claim 6, wherein the biometric capture device is an imaging device, and wherein the first captured data comprises a first image.

8. The control system of claim 6, wherein the control system is arranged to determine the user data in response to receiving a request to weigh an empty container.

9. The control system of claim 1, wherein the memory is configured to store respective user data associated with each of a plurality of users, wherein for each user the user data comprises respective container data and biometric data.

10. The control system of claim 9, wherein the control system is configured to:

compare the captured data to the biometric data of each of the plurality of users to identify the user in the captured data; and identify the respective container data associated with the identified user.

11. The control system of claim 1, wherein the control system is configured to delete the user data associated with the user from the memory following the determination of the corrected weight.

12. The control system of claim 1, wherein the control system is arranged to output a signal indicative of the corrected weight.

13. The control system of claim 1, wherein the control system is arranged to:

determine label data for the product in dependence on the corrected weight; and output a print signal to a label printing device to cause the label printing device to print an information label for the item to display the label data.

14. The control system of claim 13, wherein the memory is configured to store price information associated with the product, and the control system is configured to determine the label data in dependence on the corrected weight and the price information.

15. The control system of claim 14, wherein the label data comprises a machine readable code indicative of the corrected weight and the price information.

16. A weighing system comprising:

At least one biometric capture device;

At least one scale; and the control system of claim 1.

17. The weighing system of claim 16, further comprising at least one label printing device for printing an information label for the product.

18. The weighing system of claim 16, further comprising a user interface configured to receive a user input indicative of a request to weigh a product in a container.

19. A computer-implemented method for weighing a product at a weighing apparatus, comprising:

storing user data associated with a user, the user data comprising biometric data indicative of a biometric identifier of the user and container data indicative of an empty container weight;

receiving a request to weigh a product in a container;

receiving captured data indicative of the biometric identifier of the user from a biometric capture device associated with the weighing apparatus;

outputting a control signal to control a scale associated with the weighing apparatus to weigh the product in the container;

receiving, from the scale, weight data indicative of the weight measured by the scale;

automatically identifying the container data associated with the user by comparing the captured data to the biometric data stored in the memory; and automatically determining a corrected weight of the product in dependence on the weight data and the container data that is automatically identified.

20. A computer readable storage medium including instructions to perform a method comprising:

storing user data associated with a user, the user data comprising biometric data indicative of a biometric identifier of the user and container data indicative of an empty container weight;

receiving a request to weigh a product in a container;

receiving captured data indicative of the biometric identifier of the user from a biometric capture device associated with the weighing apparatus;

outputting a control signal to control a scale associated with the weighing apparatus to weigh the product in the container;

receiving, from the scale, weight data indicative of the weight measured by the scale;

automatically identifying the container data associated with the user by comparing the captured data to the biometric data stored in the memory; and automatically determining a corrected weight of the product in dependence on the weight data and the container data that is automatically identified.

* * * * *